(12) United States Patent
Morisaku et al.

(10) Patent No.: US 12,444,798 B2
(45) Date of Patent: Oct. 14, 2025

(54) POWER STORAGE DEVICE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Naoto Morisaku, Kariya (JP); Hirokazu Kotake, Kariya (JP); Satoshi Morioka, Okazaki (JP); Motoyoshi Okumura, Nagoya (JP); Takuro Kikuchi, Tokyo (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 1000 days.

(21) Appl. No.: 17/612,787

(22) PCT Filed: May 25, 2020

(86) PCT No.: PCT/JP2020/020589
§ 371 (c)(1),
(2) Date: Nov. 19, 2021

(87) PCT Pub. No.: WO2020/241585
PCT Pub. Date: Dec. 3, 2020

(65) Prior Publication Data
US 2022/0247023 A1    Aug. 4, 2022

(30) Foreign Application Priority Data
May 31, 2019   (JP) .................................. 2019-103057

(51) Int. Cl.
*H01M 50/209*    (2021.01)
*H01M 10/04*     (2006.01)
(Continued)

(52) U.S. Cl.
CPC ..... *H01M 50/209* (2021.01); *H01M 10/0418* (2013.01); *H01M 10/0481* (2013.01);
(Continued)

(58) Field of Classification Search
CPC ............ H01M 50/209; H01M 50/262; H01M 50/264; H01M 50/252; H01M 2220/20
See application file for complete search history.

(56) References Cited

FOREIGN PATENT DOCUMENTS

| JP | 2001-88564 A | 4/2001 |
|---|---|---|
| JP | 2001-236937 A | 8/2001 |

(Continued)

OTHER PUBLICATIONS

International Preliminary Report on Patentability issued Nov. 16, 2021 in International Application No. PCT/JP2020/020589.
(Continued)

*Primary Examiner* — Holly Rickman
(74) *Attorney, Agent, or Firm* — Sughrue Mion, PLLC

(57) ABSTRACT

A power storage device includes a module laminate including a plurality of power storage modules arranged in one direction; a pair of end plates respectively arranged at both ends of the module laminate in the one direction; a fastening bolt configured to fasten the pair of end plates together around the module laminate and apply a predetermined restraint load to the module laminate via the end plate; and a collar member including a through-hole allowing the fastening member to be inserted therethrough, the collar member being sandwiched by the pair of end plates around the module laminate. The through-hole of the collar member is eccentric with respect to a center axis of the collar member so as to approach a side where the module laminate is arranged.

3 Claims, 8 Drawing Sheets

(51) Int. Cl.
    *H01M 50/264*    (2021.01)
    *H01M 10/613*    (2014.01)
    *H01M 10/6557*   (2014.01)
    *H01M 10/6561*   (2014.01)

(52) U.S. Cl.
    CPC ........ *H01M 50/264* (2021.01); *H01M 10/613* (2015.04); *H01M 10/6557* (2015.04); *H01M 10/6561* (2015.04); *H01M 2220/20* (2013.01)

(56) References Cited

FOREIGN PATENT DOCUMENTS

| | | |
|---|---|---|
| JP | 2006-185737 A | 7/2006 |
| JP | 2013-008478 A | 1/2013 |
| JP | 2013-045602 A | 3/2013 |

OTHER PUBLICATIONS

Office Action dated Jul. 28, 2022 from the Indian Patent Office in IN Application No. 202117060788.

POWER STORAGE DEVICE

CROSS REFERENCE TO RELATED APPLICATIONS

This application is a National Stage of International Application No. PCT/JP2020/020589, filed May 25, 2020, claiming priority to Japanese Patent Application No. 2019-103057, filed May 31, 2019.

TECHNICAL FIELD

An aspect of the present disclosure relates to a power storage device.

BACKGROUND ART

A power storage device mounted on an electric vehicle, a hybrid vehicle, and the like is known. As such a power storage device, for example, Patent Document 1 discloses a power storage device (battery pack) including a plurality of battery modules (battery cells), a pair of end plates arranged at both ends in a laminating direction of a module laminate obtained by laminating these battery modules, and a fastening member fastening the pair of end plates. The fastening member is disposed outside an outer shape of a power storage module (around the module laminate) when viewed from the laminating direction.

CITATION LIST

Patent Literature

Patent Document 1: Japanese Unexamined Patent Publication No. 2001-236937

SUMMARY OF INVENTION

Technical Problem

By inserting a collar member of a certain distance into the fastening member and restraining the collar member to be sandwiched between the pair of end plates, the distance between the pair of end plates can be appropriately maintained. That is, the pair of end plates can apply an appropriate restraint load to the module laminate. Further, it is desirable to arrange the fastening members at a shortest possible interval in order to suppress the deformation of the pair of end plates and it is particularly desirable to shorten a gap between the fastening members arranged with the module laminate interposed therebetween.

An object of an aspect of the present disclosure is to provide a power storage device capable of shortening a gap between fastening members arranged with a module laminate interposed therebetween.

Solution to Problem

A power storage device according to an aspect of the present disclosure includes: a module laminate including a plurality of power storage modules arranged in one direction; a pair of end plates respectively arranged at both ends of the module laminate in the one direction; a fastening member configured to fasten the pair of end plates together around the module laminate and apply a predetermined restraint load to the module laminate via the end plates; and a collar member including a through-hole allowing the fastening member to be inserted therethrough, and the collar member being sandwiched by the pair of end plates around the module laminate, wherein the through-hole of the collar member is eccentric with respect to a center axis of the collar member so as to approach a side where the module laminate is arranged.

In the power storage device of this configuration, the through-hole of the collar member is eccentric with respect to the center axis of the collar member so as to approach the side where the module laminate is arranged. In this configuration, it is possible to shorten a distance between the fastening members when the collar members are arranged with the module laminate interposed therebetween compared to a case in which the position of the through-hole formed in the collar member matches the center axis of the collar member. As a result, it is possible to shorten a gap between the fastening members arranged with the module laminate interposed therebetween.

In the power storage device according to an aspect of the present disclosure, the power storage module may be a bipolar battery in which bipolar electrodes each having a positive electrode layer formed on one surface of a current collector and a negative electrode layer formed on the other surface are laminated via a separator, and the module laminate may be formed such that a plurality of the bipolar batteries are laminated via a conductive plate. In this configuration, since the deformation of the pair of end plates is suppressed and the flatness thereof is maintained, the end plate can equally press the module laminate. As a result, since the electrical contact between the bipolar batteries via the conductive plate is satisfactory, the battery performance of the power storage device can be improved.

In the power storage device according to an aspect of the present disclosure, the collar member may be formed such that a locked portion is formed in at least one of both end portions contacting the pair of end plates, and the end plates contacting the locked portion may be provided with a locking portion configured to lock the locked portion. Accordingly, the rotation of the collar member with respect to the end plate can be regulated by a simple configuration.

In the power storage device according to an aspect of the present disclosure, the collar member may be formed such that an inner portion and an outer portion in a reference direction have different side surface shapes, the reference direction being a direction from the outside of the end plate to the inside of the end plate, the locking portion may include a first locking portion configured to lock the locked portion when the collar member is assembled to the power storage device in a correct orientation of the reference direction and a second locking portion configured to lock the locked portion when the collar member is assembled to the power storage device in an incorrect orientation in the reference direction, and the locking portion may be formed so that a part of the collar member contacts the module laminate when the locked portion is assembled while locked to the second locking portion and the collar member does not contact the module laminate when the locked portion is assembled while locked to the first locking portion.

In the power storage device with this configuration, since a part of the collar member contacts the module laminate even when it is attempted to assemble the collar member in the incorrect orientation, the collar member cannot be assembled. Accordingly, it is possible to prevent the collar member from being assembled in the incorrect orientation.

Advantageous Effects of Invention

According to an aspect of the present disclosure, it is possible to shorten a gap between fastening members arranged with a module laminate interposed therebetween.

DESCRIPTION OF EMBODIMENTS

Figure 1:
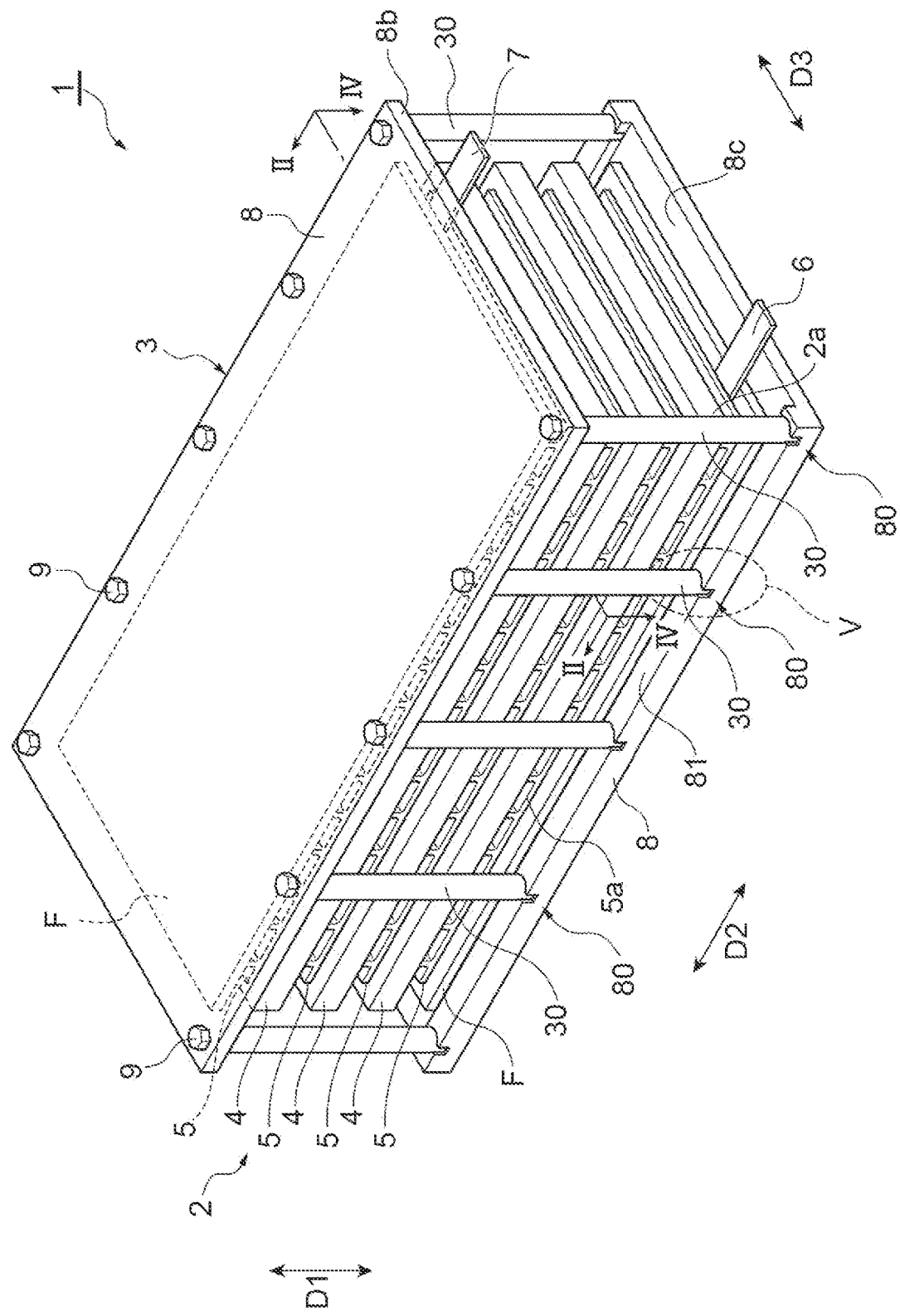
FIG. 1 is a perspective view showing a power storage device according to an embodiment.

Hereinafter, an embodiment will be described in detail with reference to the accompanying drawings. In the description of the drawings, the same reference numerals are used for the same or equivalent elements, and duplicate description is omitted.

Figure 2:
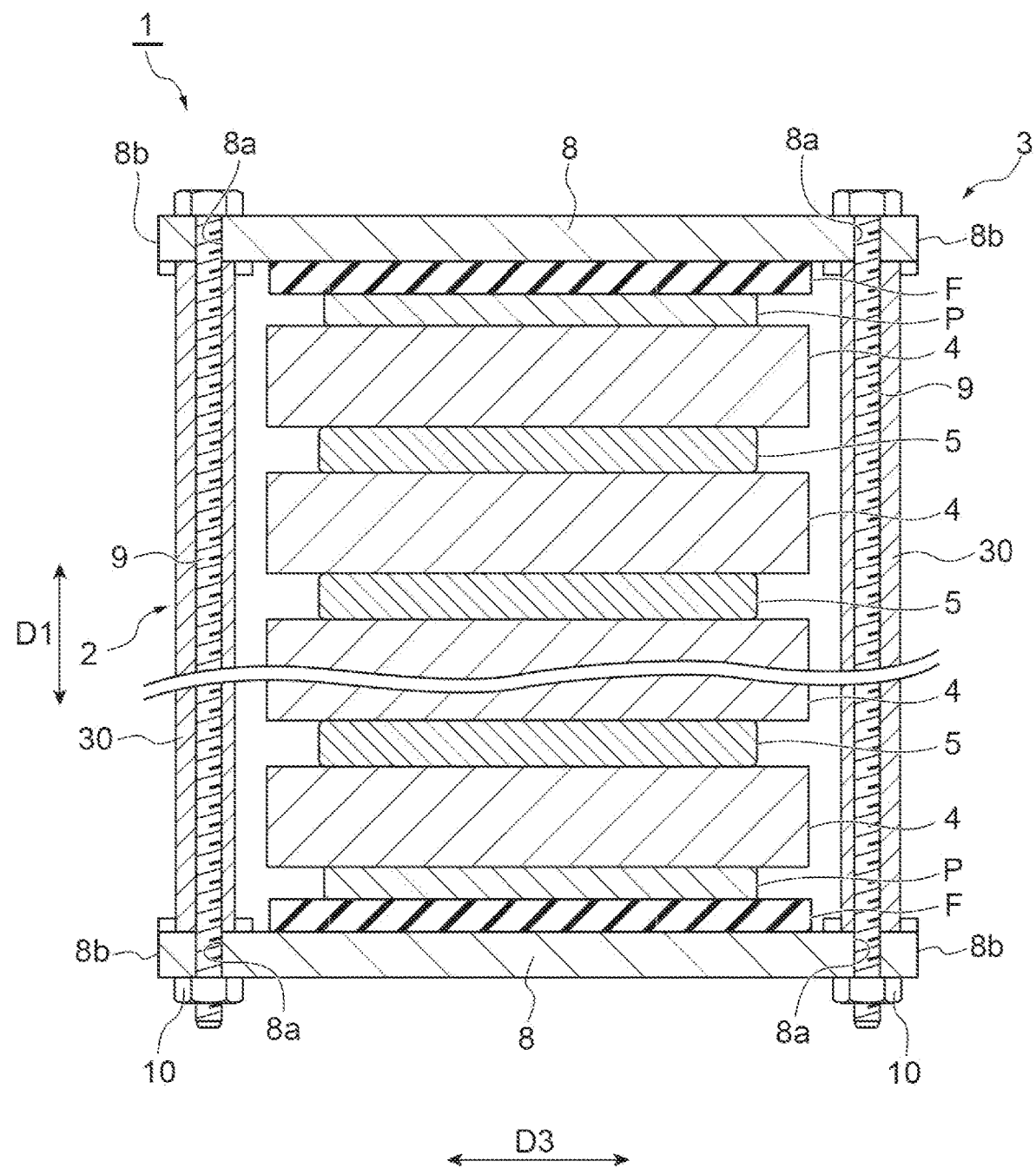
FIG. 2 is a cross-sectional view of the power storage device when viewed from a direction II-II in FIG. 1.

A power storage device 1 shown in FIGS. 1 and 2 is used as a battery for various vehicles such as forklifts, hybrid vehicles, and electric vehicles. The power storage device 1 includes a module laminate 2 which includes a plurality of laminated power storage modules 4 and a restraint member 3 that applies a restraint load to the module laminate 2 in a laminating direction (one direction) D1 of the module laminate 2.

The module laminate 2 includes the plurality of power storage modules 4 and a plurality of conductive plates 5. The power storage module 4 is a secondary battery including a positive electrode 16 in which a positive electrode active material layer is formed on a surface of a conductive current collector 15, a negative electrode 17 in which a negative electrode active material layer is formed on a surface of the current collector 15, and a power generation element which has an electrolyte layer holding an electrolytic solution in a separator 13 disposed between the positive electrode 16 and the negative electrode 17, is a bipolar battery including a plurality of laminated bipolar electrodes 14, and has a rectangular shape when viewed from the laminating direction D1. The power storage module 4 is, for example, a secondary battery such as a nickel-hydrogen secondary battery or a lithium-ion secondary battery and in the following description, a nickel-hydrogen secondary battery will be exemplified.

The power storage modules 4 which are adjacent to each other in the laminating direction D1 are electrically connected to each other via the conductive plate 5. The conductive plate 5 is made of, for example, a metal plate having good conductivity. Here, the power storage modules 4 are arranged at the laminated end of the module laminate 2 and the conductive plate 5 is disposed between the power storage modules 4 which are adjacent to each other in the laminating direction D1. A conductive plate P which is different from the conductive plate 5 is disposed outside the power storage module 4 located at the laminated end in the laminating direction. The conductive plate P is composed of, for example, a metal plate having good conductivity or the like. Accordingly, the plurality of power storage modules 4 are connected in series in the laminating direction D1. A positive electrode terminal 6 is connected to one conductive plate P and a negative electrode terminal 7 is connected to the other conductive plate P. The positive electrode terminal 6 and the negative electrode terminal 7 are drawn out from, for example, the edge portion of the conductive plate P in a direction (first direction D2) intersecting the laminating direction D1. The power storage device 1 is charged and discharged via the positive electrode terminal 6 and the negative electrode terminal 7.

The conductive plate 5 disposed between the power storage modules 4 is provided with a plurality of flow paths 5a through which a cooling fluid such as air flows. The plurality of flow paths 5a extend, for example, in a direction (second direction D3) intersecting (orthogonal to) the laminating direction D1 and each of the drawing directions of the positive electrode terminal 6 and the negative electrode terminal 7. The conductive plate 5 has a function as a connecting member that electrically connects adjacent power storage modules 4. Further, the conductive plate 5 also has a function as a heat radiating member that dissipates heat generated by the power storage module 4 by circulating a cooling fluid through the plurality of flow paths 5a. In the example of FIG. 1, the area of the conductive plate 5 viewed from the laminating direction D1 is smaller than the area of the power storage module 4, but from the viewpoint of improving heat dissipation, the area of the conductive plate 5 may be the same as the area of the power storage module 4 or may be larger than the area of the power storage module 4. Additionally, the laminating direction D1, the first direction D2, and the second direction D3 are orthogonal to each other.

The restraint member 3 includes a pair of end plates 8 which sandwich the module laminate 2 in the laminating direction D1 and a fastening bolt 9 and a nut 10 which fasten the end plates 8 to each other. The end plate 8 is a rectangular metal plate having an area one size larger than the areas of the power storage module 4, the conductive plate 5, and the conductive plate P when viewed from the laminating direction D1. An insulating plate F having electrical insulation is provided on the surface of the end plate 8 on the side of the module laminate 2. The end plate 8 and the conductive plate P are insulated from each other by the insulating plate F.

One or more through-holes 8a are provided in an edge portion 8b of the end plate 8 which is a region that surrounds a portion facing the module laminate 2 in the end plate 8. The fastening bolt 9 is inserted from the through-hole 8a of one end plate 8 toward the through-hole 8a of the other end plate 8. The nut 10 is screwed to the tip portion of the fastening bolt 9 protruding from the through-hole 8a of the other end plate 8. Accordingly, the power storage module 4, the conductive plate 5, and the conductive plate P are sandwiched by the end plates 8 and are unitized as the module laminate 2. The fastening bolt 9 applies a predetermined restraint load to the module laminate 2 via the pair of end plates 8 and 8. That is, a restraint load is applied to the module laminate 2 in the laminating direction D1 by the pair of end plates 8 and 8. In this embodiment, the fastening bolt 9 is inserted into the through-hole of the collar member 30 made of a metal material such as aluminum or iron. Additionally, the collar member 30 will be described in detail later.

Figure 3:
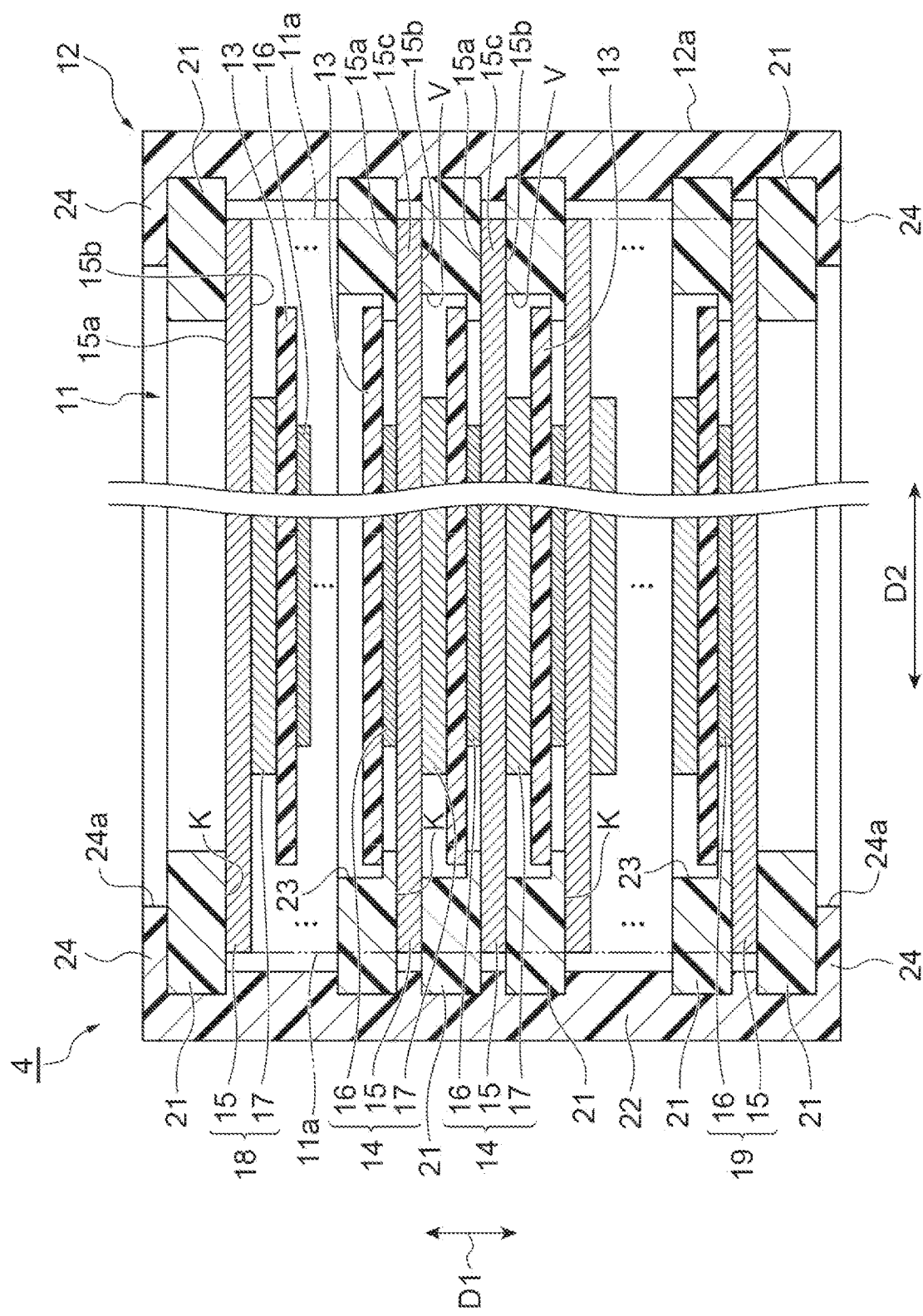
FIG. 3 is a schematic cross-sectional view showing a power storage module included in the power storage device shown in FIG. 1.

Next, the configuration of the power storage module 4 will be described in detail. As shown in FIG. 3, the power storage module 4 includes an electrode laminate 11 and a resinous sealant 12 that seals the electrode laminate 11. The electrode laminate 11 includes a plurality of electrodes which are laminated in the laminating direction D1 of the power storage module 4 via the separator 13. These electrodes include a plurality of bipolar electrodes 14, a negative electrode terminating electrode 18, and a positive electrode terminating electrode 19. That is, the electrode laminate 11 includes a bipolar electrode laminate in which the plurality of bipolar electrodes 14 and the plurality of separators 13 holding an electrolytic solution are alternately laminated, a negative electrode terminating electrode 18 which is disposed at one end of the bipolar electrode laminate in the laminating direction D1 via the separator 13, and a positive electrode terminating electrode 19 which is disposed at the other end of the bipolar electrode laminate in the laminating direction D1 via the separator 13. Each of the bipolar electrode 14, the negative electrode terminating electrode 18, and the positive electrode terminating electrode 19 has, for example, a rectangular shape when viewed from the laminating direction D1.

The bipolar electrode 14 includes a current collector 15 which includes one surface 15*a* of the current collector 15 and the other surface 15*b* on the side opposite to one surface 15*a* of the current collector 15, a positive electrode (positive electrode layer) 16 which is provided on one surface 15*a* of the current collector 15, and a negative electrode (negative electrode layer) 17 which is provided on the other surface 15*b*. The positive electrode 16 is formed by applying a positive electrode active material to the current collector 15. As the positive electrode active material forming the positive electrode 16, for example, nickel hydroxide can be exemplified. The negative electrode 17 is formed by applying a negative electrode active material to the current collector 15. As the negative electrode active material forming the negative electrode 17, for example, a hydrogen storage alloy can be exemplified.

In this embodiment, the formation region of the positive electrode 16 in one surface 15*a* of the current collector 15 is one size smaller than the formation region of the negative electrode 17 in the other surface 15*b* of the current collector 15. In the electrode laminate 11, the positive electrode 16 of one bipolar electrode 14 faces the negative electrode 17 of another bipolar electrode 14 adjacent to one side of the laminating direction D1 with the separator 13 interposed therebetween. In the electrode laminate 11, the negative electrode 17 of one bipolar electrode 14 faces the positive electrode 16 of another bipolar electrode 14 adjacent to the other side of the laminating direction D1 with the separator 13 interposed therebetween.

The negative electrode terminating electrode 18 includes the current collector 15 and the negative electrode 17 which is provided on one surface 15*b* of the current collector 15. The negative electrode terminating electrode 18 is disposed so that the surface 15*b* provided with the negative electrode 17 faces the positive electrode 16 of the bipolar electrode 14 which is adjacent thereto with the separator 13 interposed therebetween in the laminating direction D1. The other surface 15*a* of the current collector 15 of the negative electrode terminating electrode 18 constitutes an outer surface on one side of the laminating direction D1 of the power storage module 4 and is electrically connected to at least one of the conductive plate 5 and the conductive plate P on one side adjacent to the power storage module 4 (see FIG. 1).

The positive electrode terminating electrode 19 includes the current collector 15 and the positive electrode 16 which is provided on one surface 15*a* of the current collector 15. The positive electrode terminating electrode 19 is disposed so that the surface 15*a* provided with the positive electrode 16 faces the negative electrode 17 of the bipolar electrode 14 adjacent thereto with the separator 13 interposed therebetween in the laminating direction D1. The other surface 15*b* of the current collector 15 of the positive electrode terminating electrode 19 constitutes an outer surface on the other side of the laminating direction D1 of the power storage module 4 and is electrically connected to at least one of the conductive plate 5 and the conductive plate P on the other side adjacent to the power storage module 4 (see FIG. 1).

The current collector 15 is made of, for example, a nickel plate whose surface is plated, a steel plate whose surface is plated, or the like. Here, the current collector 15 is composed of a nickel-plated steel plate obtained by plating the surface of the steel plate with nickel. For the steel plate used as the base material of the plated steel plate, for example, ordinary steel such as rolled steel or special steel such as stainless steel is used. The current collector 15 has a rectangular shape when viewed from the laminating direction D1. An edge portion 15*c* of the current collector 15 is provided with a rectangular frame-shaped uncoated region in which the positive electrode active material and the negative electrode active material are not coated.

The separator 13 is formed in, for example, a sheet shape. Examples of the separator 13 include a porous film made of a polyolefin resin such as polyethylene (PE) and polypropylene (PP), a woven fabric made of polypropylene, methyl cellulose, and the like, and a non-woven fabric. The separator 13 may be reinforced with a vinylidene fluoride resin compound.

The sealant 12 is formed in a rectangular tubular shape as a whole by, for example, an insulating resin. The sealant 12 is provided on a side surface 11*a* of the electrode laminate 11 to surround the edge portion 15*c* of each current collector 15. The sealant 12 holds the edge portion 15*c* of each current collector 15 in the side surface 11*a* of the electrode laminate 11. The sealant 12 includes a plurality of first sealing portions 21 which are coupled to the edge portion 15*c* of each current collector 15 and a second sealing portion 22 which includes a portion extending in the laminating direction D1 to cover the side surface 11*a* of the electrode laminate 11 and coupled to each of the plurality of first sealing portions 21. The first sealing portion 21 and the second sealing portion 22 are made of an insulating resin having alkali resistance. Examples of the materials constituting the first sealing portion 21 and the second sealing portion 22 include polypropylene (PP), polyphenylene sulfide (PPS), modified polyphenylene ether (modified PPE), and the like.

The first sealing portion 21 is provided in the uncoated region of the edge portion 15*c* of the current collector 15 between the pair of facing electrodes. The first sealing portion 21 has a rectangular shape when viewed from the laminating direction D1. In this embodiment, the first sealing portion 21 is provided not only for the current collector 15 of the bipolar electrode 14 but also for the current collector 15 of the negative electrode terminating electrode 18 and the current collector 15 of the positive electrode terminating electrode 19. In the negative electrode terminating electrode 18, the first sealing portion 21 is provided in the edge portions 15c of both one surface 15a and the other surface 15b of the current collector 15 and in the positive electrode terminating electrode 19, the first sealing portion 21 is provided in the edge portions 15c of both one surface 15a and the other surface 15b of the current collector 15.

The first sealing portion 21 includes an overlapping portion K which overlaps the edge portion 15c of the current collector 15 when viewed from the laminating direction D1. The first sealing portion 21 which is provided between the pair of facing electrodes is airtightly bonded to the current collector 15 of one electrode by, for example, ultrasonic welding and heat welding in the overlapping portion K. The first sealing portion 21 is formed by using, for example, a film having a predetermined thickness in the laminating direction D1. The first sealing portion 21 includes an inner portion which is located between the edge portions 15c of the current collectors 15 which are adjacent to each other in the laminating direction D1 and an outer portion which projects outward from the outer edge of the current collector 15 and the outer portion is held by the second sealing portion 22. In the first sealing portions 21 which are adjacent to each other in the laminating direction D1, the outer portions may be bonded to each other by welding means such as ultrasonic welding and heat welding.

In the electrode laminate 11, the first sealing portion 21 disposed between the electrodes adjacent to each other in the laminating direction D1 is provided with a step portion 23 for placing the edge portion of the separator 13 on the inner portion thereof. The step portion 23 may be formed by folding back a single film constituting the first sealing portion 21 at the outer portion. The step portion 23 may be formed by superimposing the film forming the upper stage on the film forming the lower stage.

The second sealing portion 22 is provided outside the electrode laminate 11 and the first sealing portion 21 and constitutes the outer wall (housing) of the power storage module 4. The second sealing portion 22 is formed by, for example, injection-molding of a resin and extends in the laminating direction D1 over the entire length of the side surface 11a of the electrode laminate 11. The second sealing portion 22 has a rectangular frame shape extending in the axial direction which is the laminating direction D1. The second sealing portion 22 is welded to the outer edge portion of the first sealing portion 21, for example, by heat during injection-molding.

The second sealing portion 22 includes an overhang portion 24 formed at each of both end portions in the laminating direction D1. One overhang portion 24 projects to the inner edge side of the first sealing portion 21 having a rectangular frame-shape at one end portion of the laminating direction D1 and is coupled to the first sealing portion 21 welded to one surface 15a of the current collector 15 of the negative electrode terminating electrode 18 constituting the outer surface of the power storage module 4. The other overhang portion 24 projects to the inner edge side of the first sealing portion 21 having a rectangular frame shape at the other end portion of the laminating direction D1 and is coupled to the first sealing portion 21 welded to the surface 15b of the current collector 15 of the positive electrode terminating electrode 19 constituting the outer surface of the power storage module 4. A tip 24a of the overhang portion 24 is located to overlap the overlapping portion K between the current collector 15 and the first sealing portion 21 when viewed from the laminating direction D1.

The first sealing portion 21 and the second sealing portion 22 form an internal space V between the adjacent electrodes and seal the internal space V. More specifically, the second sealing portion 22 seals each of a gap between the bipolar electrodes 14 adjacent to each other in the laminating direction D1, a gap between the negative electrode terminating electrode 18 and the bipolar electrode 14 adjacent to each other in the laminating direction D1, and a gap between the positive electrode terminating electrode 19 and the bipolar electrode 14 adjacent to each other in the laminating direction D1 together with the first sealing portion 21. Accordingly, the air-tightly partitioned internal space V is formed between the adjacent bipolar electrodes 14, between the negative electrode terminating electrode 18 and the bipolar electrode 14, and between the positive electrode terminating electrode 19 and the bipolar electrode 14. An aqueous electrolytic solution (not shown) containing an alkaline solution such as an aqueous potassium hydroxide solution is stored in the internal space V. The electrolytic solution is impregnated in the separator 13, the positive electrode 16, and the negative electrode 17.

When welding the first sealing portion 21 to the current collector 15, the surface of the current collector 15 may be roughened by, for example, electrolytic plating. The roughening may be performed on at least the portion of the current collector 15 to which the first sealing portion 21 is welded. In this embodiment, at least one surface 15a in the current collector 15 constituting the bipolar electrode 14 may be roughened and both one surface 15a and the other surface 15b in the current collector 15 constituting the negative electrode terminating electrode 18 and the current collector 15 constituting the positive electrode terminating electrode 19 may be roughened.

Figure 4:
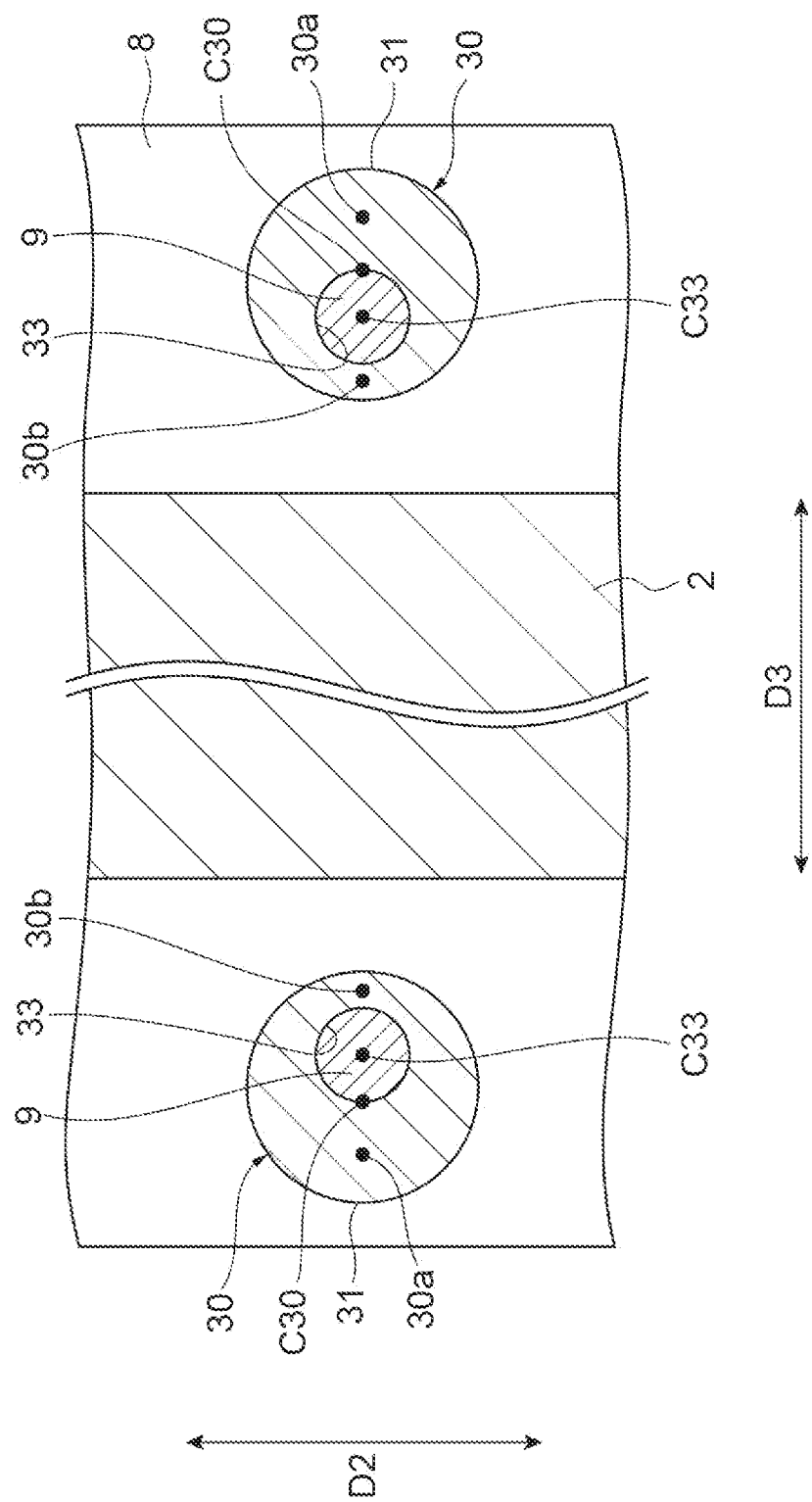
FIG. 4 is a cross-sectional view of a collar member and a fastening member when viewed from a direction IV-IV in FIG. 1.

Next, the configuration of the collar member 30 through which the fastening bolt 9 is inserted will be described in more detail. The collar member 30 is a tubular member and is provided with a through-hole 33 through which the fastening bolt 9 is inserted. As shown in FIGS. 1 and 4, the fastening bolts 9 are arranged on the outside of the outer shape of the module laminate 2 when viewed from the laminating direction D1 and are arranged along the long sides facing each other in the module laminate 2. Similarly, the collar members 30 are also arranged on the outside of the outer shape of the module laminate 2 when viewed from the laminating direction D1 and are arranged along the long sides facing each other in the module laminate 2. In this embodiment, five pairs of color members are arranged so that the pair of collar members 30 and 30 (see FIG. 4) sandwich the module laminate 2 (see FIG. 1). The direction in which the pair of collar members 30 and 30 face each other matches the second direction D3.

FIG. 4 is a cross-sectional view showing the collar members 30 which are arranged to face each other in the second direction D3 and through which the fastening bolts 9 are inserted. As shown in FIG. 4, the through-hole 33 formed in the collar member 30 is eccentric with respect to the center axis C30 of the collar member 30 so as to approach the side where the module laminate 2 is arranged. In other words, the through-hole 33 formed in the collar member 30 is eccentric so as to approach a side where the collar member 30 is arranged in which the center axis C33 of the through-hole faces the second direction D3. Additionally, the center axis C30 is an axis that extends in the extension direction (the laminating direction D1) of the collar member 30.

In the collar member 30, since the through-hole 33 formed in the collar member 30 is eccentric as described above, a thick portion 30a having a thick thickness from the through-hole 33 to the outer peripheral surface and a thin portion 30b having a thinner thickness from the through-hole 33 to the outer peripheral surface than the thick portion 30a are formed. In this embodiment, the thin portions 30b and 30b are formed at a position closer to the module laminate 2 than the thick portions 30a and 30a, in other words, a position close to the collar member 30 facing the second direction D3.

Figure 5A:
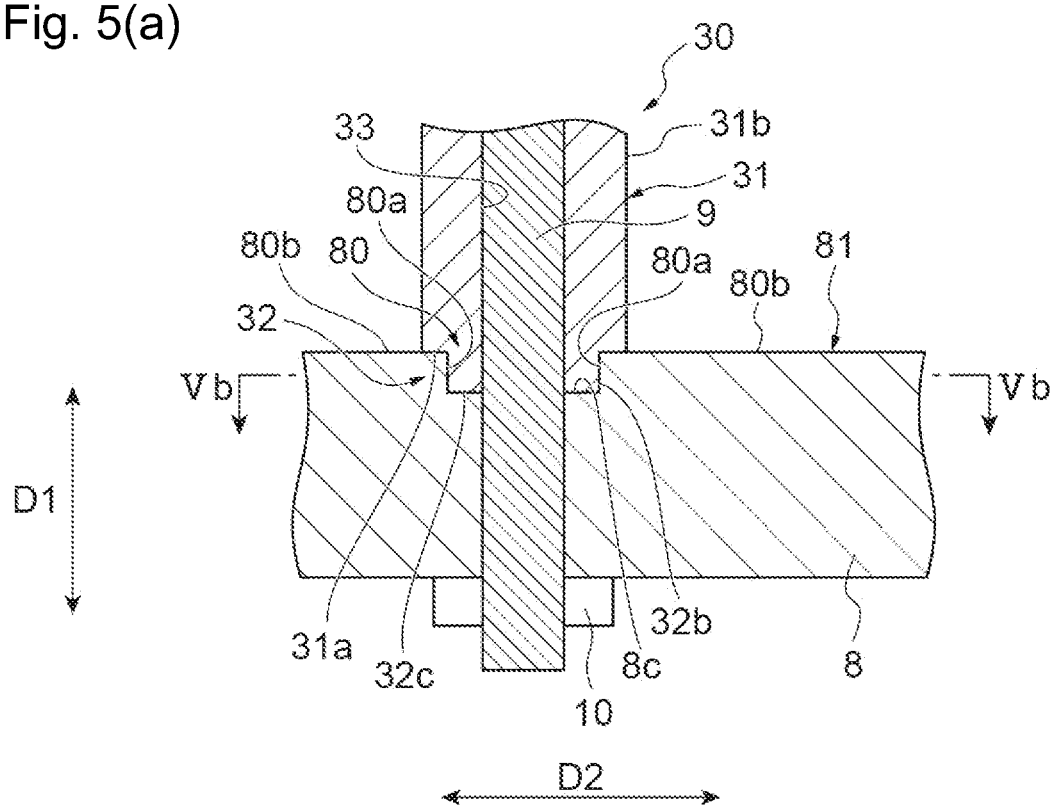
FIG. 5(a) is a cross-sectional view showing a cross-section taken along an extension direction of a collar member of a V part in FIG. 1.
Figure 5B:
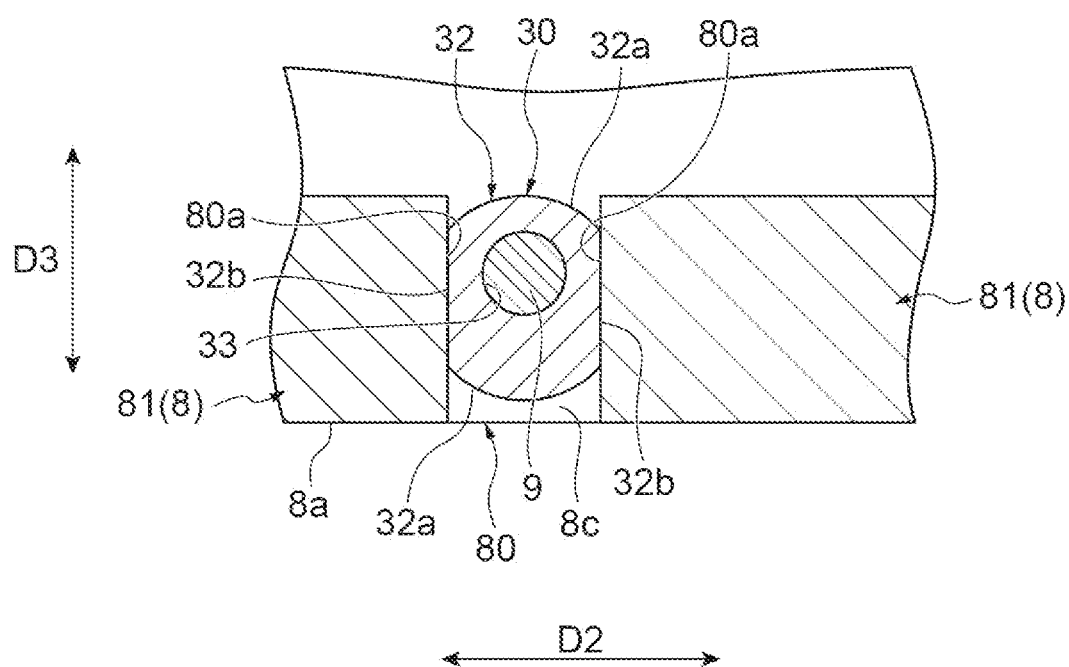
FIG. 5(b) is a cross-sectional view showing a cross-section orthogonal to the extension direction of the collar member.

A locked portion 32 for positioning (preventing the rotation of) the collar member 30 at a predetermined position of the end plate 8 is formed at an end portion (a V part of FIG. 1) from both ends of the collar member 30 to a predetermined length. As shown in FIGS. 5(a) and 5(b), the locked portion 32 is formed such that a cross-sectional shape orthogonal to the extension direction (a shape of the outer peripheral surface 31b) protrudes from the circular main body portion 31 in the extension direction. A cross-section orthogonal to the extension direction (laminating direction D1) of the locked portion 32 has a shape in which an arc-shaped portion which is a part of a circle in the plan view is cut out. That is, the locked portion 32 is formed such that the outer shape of the cross-section orthogonal to the extension direction includes a circumferential surface 32a which is formed as a curved portion and a flat surface (locked portion) 32b which is formed as a straight portion. Two flat surfaces 32b and 32b are formed to be parallel to each other.

In the end plate 8, a locking portion 80 is formed to correspond to an arrangement position of each collar member 30. In the end plate 8, the locking portion 80 is formed at ten positions. The locking portion 80 is provided to position the collar member 30 to a predetermined position of the end plate 8. The locking portion 80 is formed by a groove portion obtained by notching a part of a projection portion 81 protruding from the end plate 8. Specifically, a portion provided with the projection portion 81 and a portion not provided with the projection portion 81 exist in a stripe-shaped region along the long side of the end plate 8 and a portion not provided with the projection portion 81 is formed in a shape (groove shape) recessed from the adjacent projection portions 81 and 81. The locking portion 80 is formed by a groove portion recessed from the surface of the projection portion 81.

The projection portion 81 includes a side surface support portion 80a and an end surface support portion 80b. The side surface support portion 80a is a portion that supports the flat surface 32b of the locked portion 32 of the collar member 30 and is formed by the side surface portion of the projection portion 81. The end surface support portion 80b is a portion that supports the end surface 31a of the main body portion 31 of the collar member 30 and is formed by the upper surface of the projection portion 81.

Next, the assembling method of the power storage device 1 will be described. First, the plurality of power storage modules 4 and the plurality of conductive plates 5 are prepared and the power storage modules 4 and the conductive plates 5 are alternately laminated to form the module laminate 2 shown in FIGS. 1 and 2. Next, the pair of end plates 8, the plurality of fastening bolts 9, the plurality of nuts 10, and the plurality of collar members 30 are prepared. Then, one end plate 8 is disposed at one end of the module laminate 2 in the laminating direction D1 and the other end of the fastening bolt 9 is inserted through the through-hole 8a from the outside of the end plate 8.

Next, the collar member 30 is externally inserted from the other end of the fastening bolt 9. At this time, the locked portion 32 of the collar member 30 is locked by the locking portion 80 of one end plate 8. More specifically, the end surface 32c of the locked portion 32 formed at one end portion of the collar member 30 in the extension direction is brought into contact with the inner surface 8c of one end plate 8 (the surface on the arrangement side of the module laminate 2 in an assembled state of the power storage module 4) and the flat surfaces 32b and 32b are brought into contact with the side surface support portion 80a of the locking portion 80. Accordingly, the collar member 30 is not rotatable with respect to one end plate 8.

Next, the other end of the fastening bolt 9 through which the collar member 30 is inserted is inserted through the through-hole 8a of the other end plate 8 from the inside of the other end plate 8. At this time, the locked portion 32 of the collar member 30 is locked to the locking portion 80 of the other end plate 8. More specifically, the end surface 32c of the locked portion 32 formed at the other end portion of the collar member 30 in the extension direction is brought into contact with the inner surface 8c of the other end plate 8 (the surface on the arrangement side of the module laminate 2 in an assembled state of the power storage module 4) and the flat surfaces 32b and 32b are brought into contact with the side surface support portion 80a of the locking portion 80. Accordingly, the collar member 30 is not rotatable with respect to one end plate 8. Next, the nut 10 is screwed to the other end portion of the fastening bolt 9 protruding from the through-hole 8a of the other end plate 8. In such a method, the power storage device 1 can be assembled.

In the power storage device 1 of the above-described embodiment, as shown in FIG. 4, the through-hole 33 of the collar member 30 is eccentric with respect to the center axis C30 of the collar member 30 so as to approach the side where the module laminate 2 is arranged in the second direction D3. Accordingly, it is possible to shorten a distance between the fastening bolts 9 and 9 when the collar members 30 and 30 are arranged with the module laminate 2 interposed therebetween compared to a case in which the position of the through-hole 33 formed in the collar member 30 matches the center axis C30 of the collar members 30 and 30. As a result, it is possible to shorten a gap between the fastening bolts 9 and 9 arranged with the module laminate 2 interposed therebetween.

Figure 6:
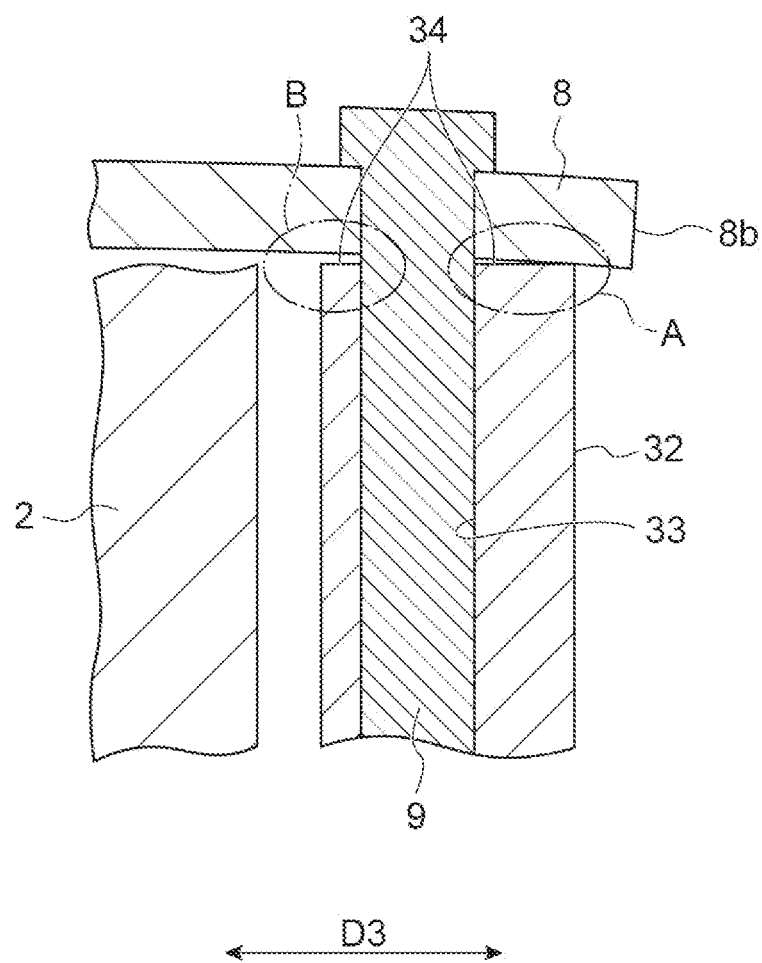
FIG. 6 is an explanatory diagram describing an effect of the power storage device according to the embodiment.

FIG. 6 is a diagram illustrating the deformation of the end plate 8 that may occur when the module laminate 2 is fastened (pressurized) with the module laminate 2 sandwiched between the pair of end plates 8 and 8. In this embodiment, since it is possible to relatively shorten a gap between the fastening bolts 9 and 9 arranged with the module laminate 2 interposed therebetween, it is possible to suppress the deformation of the end plate 8 shown in FIG. 6.

Further, the deformation of the end plate 8 is a deformation in which the edge portion 8b approaches the module laminate 2 compared to the center portion. In this embodiment, since the deformation is suppressed, the deformation amount is very small. However, the action applied from the collar member 30 to the edge portion 8b (A part shown in FIG. 6) is larger than the center portion (B part shown in FIG. 6) of the end plate 8 due to the deformation. In this embodiment, as shown in FIG. 4, a portion to which a relatively large force is applied from the collar member 30, that is, a part of the collar member 30 corresponding to the edge portion 8b (B part shown in FIG. 6) of the end plate 8 is provided with the thick portion 30a having a wide contact area with the end plate 8. Accordingly, since the force per unit area received from the collar member 30 from the end plate 8 is decreased, the damage of the end plate 8 can be reduced.

Additionally, since the thin portion 30b which is a portion thinner than the collar member 30 is located on the side of the center portion (A part shown in FIG. 6) of the end plate 8 as shown in FIG. 6, the force acting on the end plate 8 is weaker than the thick portion 30a. Thus, the force per unit area does not increase extremely even when a part of the collar member 30 corresponding to the center portion (B part shown in FIG. 6) of the end plate 8 is formed to be the thin portion 30b as shown in FIG. 6 and the risk of the damage of the end plate 8 is small.

In the power storage device 1 of the above-described embodiment, since the deformation of the pair of end plates 8 and 8 is suppressed and the flatness thereof is maintained, the pair of end plates 8 and 8 can equally press the module laminate 2. As a result, since the electrical contact between the conductive plate 5 and the power storage module 4 is satisfactory, the battery performance of the power storage device 1 can be improved.

In the power storage device 1 of the above-described embodiment, the collar member 30 is provided with the flat surfaces 32b and 32b (see FIGS. 5(a) and 5(b)) and the pair of end plates 8 and 8 are provided with the side surface support portions 80a and 80a locking the flat surfaces 32b and 32b. Accordingly, the rotation of the collar member 30 with respect to the end plate 8 can be regulated by a simple configuration.

Although an embodiment has been described in detail above, an aspect of the present disclosure is not limited to the above-described embodiment.

Figure 7:
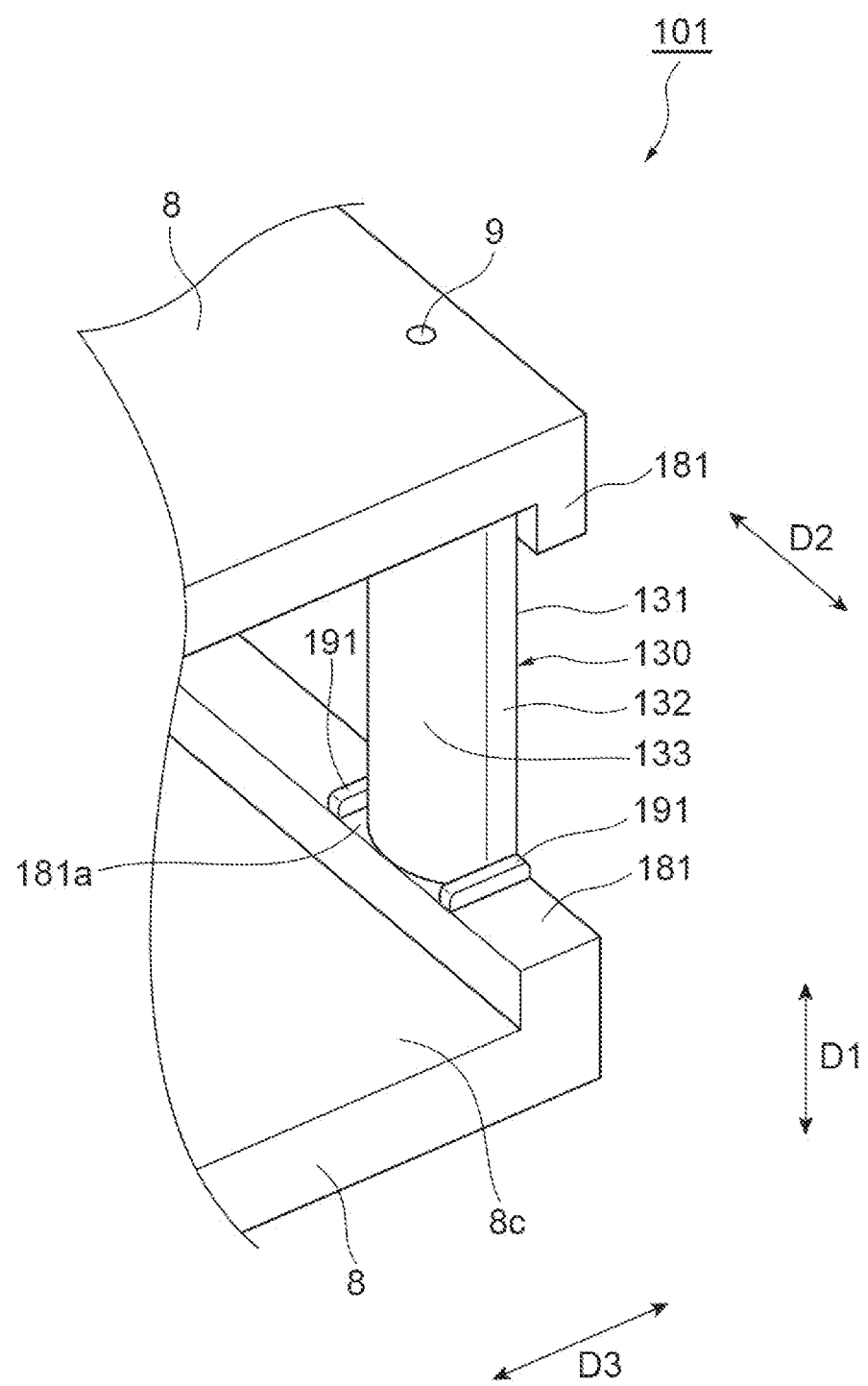
FIG. 7 is a perspective view showing a part of a power storage device according to a modified example.

An example has been described in which the locked portion 32 for positioning (preventing the rotation of) the collar member 30 is formed at both end portions (V part of FIG. 1) of the collar member 30 of the power storage device 1 of the above-described embodiment. In contrast, in a power storage device 101 according to a modified example, as shown in FIG. 7, a collar member 130 provided with a flat surface as a pair of locked surfaces (locked portions) 132 and 132 is provided in an entire part in the extension direction D1. Additionally, the module laminate 2 is not shown in FIG. 7. The collar member 130 according to the modified example is formed such that an inner portion and an outer portion in a reference direction have different side surface shapes. Further, the shape of the collar member 130 according to the modified example is formed asymmetrically with respect to the short side direction (reference direction) D3 of the end plate 8. The direction (attachment direction) of the collar member 130 when assembled to the power storage device 101 is determined. An outer peripheral surface of the collar member 130 includes an outer surface 131, a pair of locked surfaces 132 and 132, and an inner surface 133.

The outer surface 131 is formed as a flat surface. The outer surface 131 is a surface facing the outside of the power storage device 101 (the side opposite to the module laminate 2) when the collar member 130 is assembled to the power storage device 101. The locked surfaces 132 and 132 are surfaces which are locked by a protrusion (locking portion) 191 provided in at least one of the pair of end plates 8 and 8 (in this embodiment, both the pair of end plates 8 and 8).

The pair of locked surfaces 132 and 132 are respectively connected to both ends of the outer surface 131 in an orthogonal state and are formed to be parallel to each other. The inner surface 133 is formed as a curved surface. The inner surface 133 is a surface which faces the module laminate 2 when the collar member 130 is assembled to the power storage device 101. The inner surface 133 connects the pair of locked surfaces 132 and 132.

An example of the end plate 8 of the power storage device 1 of the above-described embodiment has been described in which the projection portion 81 is formed in a part of a stripe-shaped region along the long side of the end plate 8 and a portion not provided with the projection portion 81 is formed in a shape (groove shape) recessed from the adjacent projection portions 81 and 81 to form the locking portion 80 locking the locked portion 32 of the collar member 30. In contrast, the power storage device 101 according to the modified example is provided with a projection portion 181 which is formed in an entire part of a stripe-shaped region along the long side of the end plate 8 and the protrusion 191 which further protrudes from the projection portion 181 to both sides of the collar member 130 assembled as the power storage device 101 (both sides of the long side direction D2).

A portion in which the end portion of the collar member 130 is disposed in a contact state in the projection portion 181 is provided with a counterbore portion 181a which is a flat surface. The counterbore portion 181a is formed to have the same size as the width direction size (distance between the pair of locked surfaces 132 and 132) of the collar member 130. Additionally, a portion in which the end portion of the collar member 130 is not disposed in a contact state in the projection portion 181 may not be formed as a flat surface as in the counterbore portion 181a. The protrusion 191 is disposed at both ends of the counterbore portion 181a in the long side direction D2 of the end plate 8.

The pair of protrusions 191 arranged at both ends of the counterbore portion 181a extend in a straight shape in the short side direction D3 of the end plate 8. Since the protrusion 191 protrudes more than the projection portion 181, the locked surfaces 132 and 132 of the collar member 130 can be locked. That is, the protrusion 191 functions to prevent the rotation of the collar member 130. Additionally, similarly to the above-described embodiment, a throughhole 133a formed in the collar member 130 is eccentric with respect to the center axis of the collar member 30 so as to approach the side where the module laminate 2 is arranged.

Also in the configuration of the power storage device 101 including the protrusion 191 of the end plate 8 and the locked surfaces 132 and 132 of the collar member 130 of the configuration according to the modified example, similarly to the power storage device 1 of the above-described embodiment, the gap between the fastening bolts 9 and 9 arranged with the module laminate 2 interposed therebetween can be shortened and the rotation of the collar member 130 with respect to the end plate 8 can be regulated by a simple configuration.

Figure 8A:
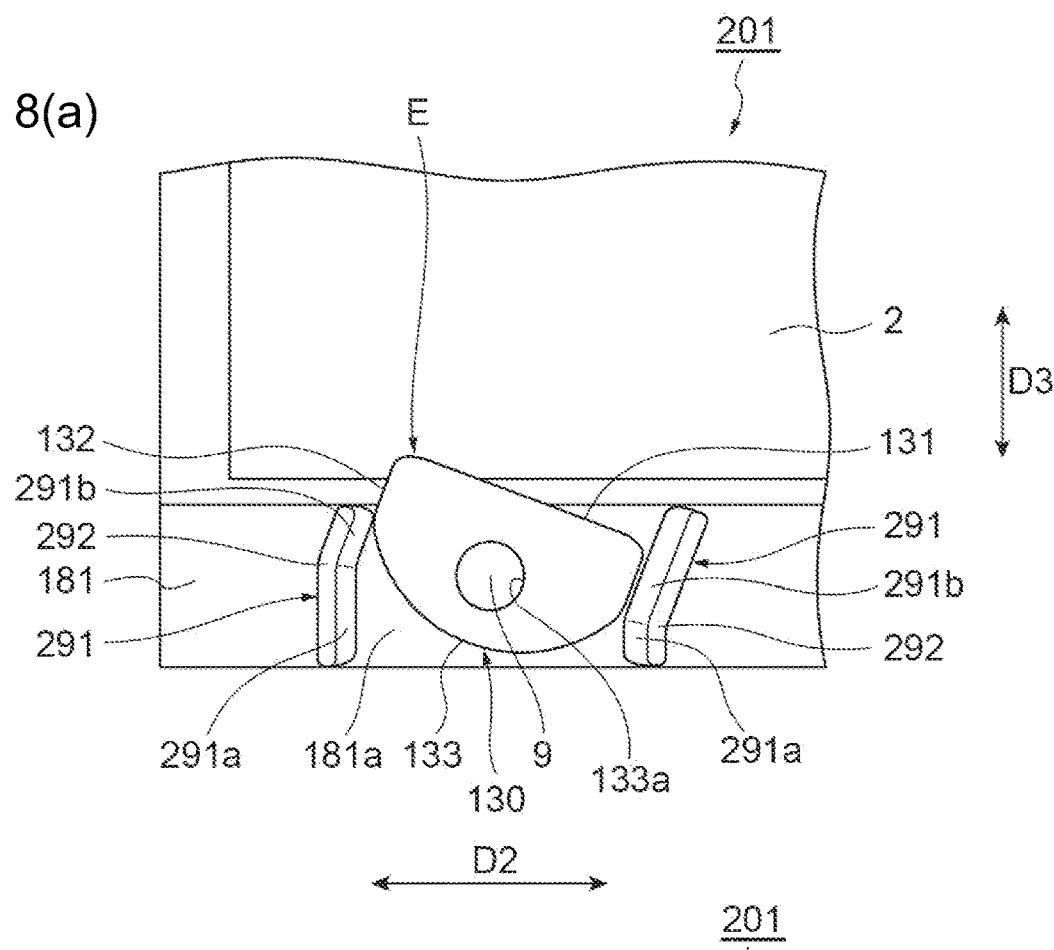
FIG. 8(a) is a plan view showing a state in which a collar member is assembled to a power storage device according to another modified example in a wrong direction.
Figure 8B:
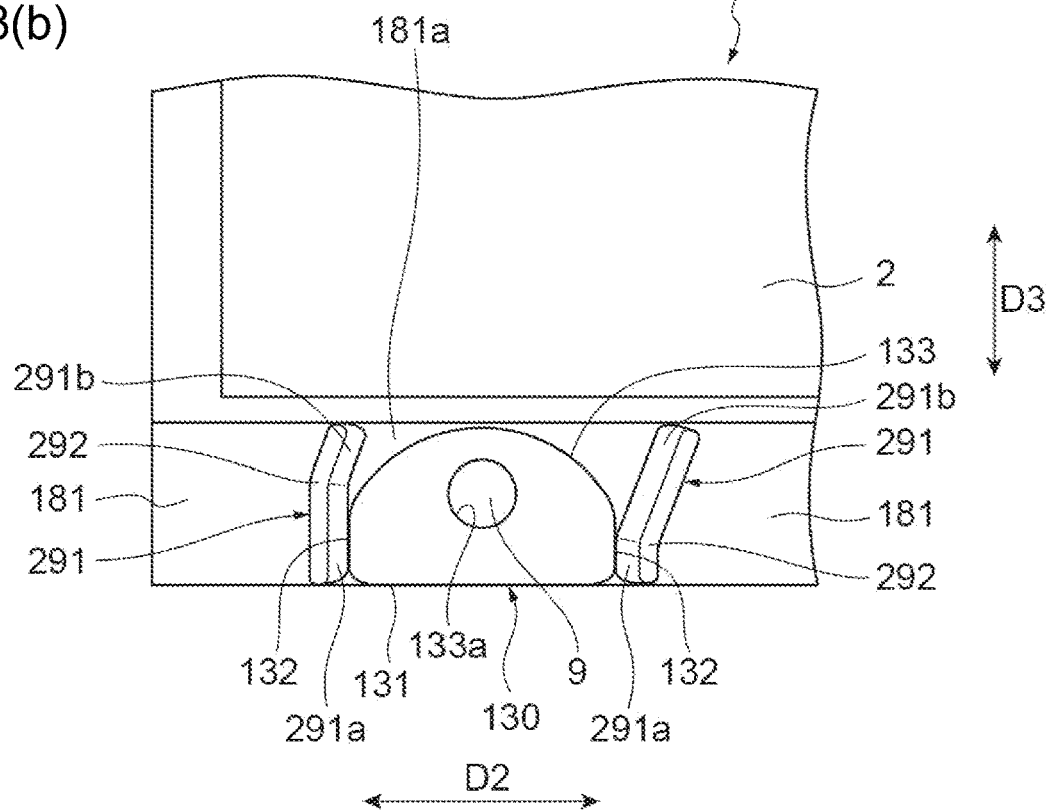
FIG. 8(b) is a plan view showing a state in which the collar member is assembled to the power storage device according to another modified example in a correct orientation.

Further, in a power storage device 201 according to another modified example, as shown in FIG. 8(b), protrusions (locking portions) 291 and 291 having a bent portion 292 formed in a part in the extension direction are provided instead of the protrusion 191 extending in a straight shape in the short side direction D3 of the end plate 8. More specifically, the protrusions 291 and 291 include first locking portions 291a and 291a which lock the locked surfaces 132 and 132 when the collar member 130 is assembled to the power storage device 201 in a correct orientation of the short side direction D3 of the end plate 8 (the extension direction of the protrusion 291) and second locking portions 291b and 291b which lock the locked surfaces 132 and 132 when the collar member 130 is assembled to the power storage device 201 in a wrong direction of the short side direction D3 of the end plate 8.

Then, in the protrusions 291 and 291, the bent portion 292 is formed so that a part E of the collar member 130 contacts the module laminate 2 when the locked surfaces 132 and 132 are assembled while being locked to the second locking portions 291b and 291b as shown in FIG. 8(a) and the collar member 130 does not contact the module laminate 2 when the locked surfaces 132 and 132 are assembled while being locked to the first locking portions 291a and 291a as shown in FIG. 8(b). That is, in the power storage device 201 according to a first modified example, since a part E of the collar member 130 contacts the module laminate 2 even when it is attempted to assemble the collar member 130 in an incorrect orientation, the collar member 130 cannot be assembled. In the power storage device 201 according to another modified example, it is possible to prevent the collar member 130 from being assembled in the incorrect orientation in addition to the effects of the power storage devices 1 and 101.

In the embodiment and the modified example described above, the module laminate 2 in which the power storage module 4 as the bipolar nickel-metal hydride secondary battery is laminated via the conductive plate 5 has been described as an example, but an aspect of the present disclosure can also be applied to a power storage device in which a module laminate obtained by laminating lithium ion secondary batteries having a square casing in one direction is sandwiched by the pair of end plates 8 and 8. Also in this case, it is possible to shorten a gap between the fastening members arranged with the module laminate interposed therebetween.

In the embodiment and the modified example described above, an example has been described in which both ends of the collar member 30 are provided with the locked portions 32 and 32 and the pair of end plates 8 and 8 are respectively provided with the locking portions 80 and 80 locking the locked portions 32 and 32. However, the locked portion 32 may be provided only at one end of the collar member 30 and the locking portion 80 may be provided only in the end plate 8 on the side contacting the locked portion 32 in the pair of end plates 8 and 8.

In the embodiment and the modified example described above, an example has been described in which the end plate 8 is provided with the rotation preventing member for the collar member 30 by locking the collar member 30 to the locking portion 80, but the present disclosure is not limited thereto. For example, the collar member 30 may be fixed to the end plate 8 or a concave portion having a size matching the size of the outer shape of the collar member 30 may be formed in the end plate 8 so that the collar member is fitted to the concave portion.

REFERENCE SIGNS LIST 1, 101, 201: power storage device, 2: module laminate, 3: restraint member, 4: power storage module (bipolar battery), 5: conductive plate, 8: end plate, 9: fastening bolt (fastening member), 15: current collector, 30, 130: collar member, 30a: thick portion, 30b: thin portion, 31: main body portion, 32: locked portion, 32a: circumferential surface, 32b: flat surface, 32c: end surface, 33: through-hole, 80: locking portion, 80a: side surface support portion, 80b: end surface support portion, 132: locked surface (locked portion), 191, 291: protrusion (locking portion), C30: center axis of collar member.

The invention claimed is:

1. A power storage device comprising:
a module laminate including a plurality of power storage modules arranged in one direction;
a pair of end plates respectively arranged at both ends of the module laminate in the one direction;
a fastening member configured to fasten the pair of end plates together around the module laminate and apply a predetermined restraint load to the module laminate via the end plates; and
a collar member including a through-hole allowing the fastening member to be inserted therethrough, the collar member being sandwiched by the pair of end plates around the module laminate,
wherein the through-hole of the collar member is eccentric with respect to a center axis of the collar member so as to approach a side where the module laminate is arranged,
wherein the power storage module is a bipolar battery in which bipolar electrodes each having a positive electrode layer formed on one surface of a current collector and a negative electrode layer formed on another surface are laminated via a separator, and
wherein the module laminate is formed such that a plurality of the bipolar batteries are laminated via a conductive plate.

2. A power storage device comprising:
a module laminate including a plurality of power storage modules arranged in one direction;
a pair of end plates respectively arranged at both ends of the module laminate in the one direction;
a fastening member configured to fasten the pair of end plates together around the module laminate and apply a predetermined restraint load to the module laminate via the end plates; and
a collar member including a through-hole allowing the fastening member to be inserted therethrough, the collar member being sandwiched by the pair of end plates around the module laminate,
wherein the through-hole of the collar member is eccentric with respect to a center axis of the collar member so as to approach a side where the module laminate is arranged,
wherein the collar member is formed such that a locked portion is formed in at least one of both end portions contacting the pair of end plates, and
wherein the end plates contacting the locked portion are provided with a locking portion configured to lock the locked portion.

3. The power storage device according to claim 2, wherein the collar member is formed such that an inner portion and an outer portion in a reference direction have different side surface shapes, the reference direction being a direction from the outside of the end plate to the inside of the end plate,
wherein the locking portion includes a first locking portion configured to lock the locked portion when the collar member is assembled to the power storage device in a correct orientation in the reference direction and a second locking portion configured to lock the locked portion when the collar member is assembled to the power storage device in an incorrect orientation in the reference direction, and wherein the locking portion is formed so that a part of the collar member contacts the module laminate when the locked portion is assembled while locked to the second locking portion and the collar member does not contact the module laminate when the locked portion is assembled while locked to the first locking portion.

\* \* \* \* \*